United States Patent
Yi et al.

(10) Patent No.: US 6,678,015 B2
(45) Date of Patent: Jan. 13, 2004

(54) COLOR SEPARATING/SYNTHESIZING APPARATUS

(75) Inventors: Jong Su Yi, Suwon-Shi (KR); Koan Young Oh, Yong-Shi (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 406 days.

(21) Appl. No.: 09/858,112

(22) Filed: May 15, 2001

(65) Prior Publication Data

US 2002/0080287 A1 Jun. 27, 2002

(30) Foreign Application Priority Data

Dec. 22, 2000 (KR) .......................... 2000-80039

(51) Int. Cl.[7] .......................... H04N 5/74; G02F 1/1335; G03B 21/14
(52) U.S. Cl. .................. 348/782; 348/756; 348/757; 349/9; 353/20; 359/495
(58) Field of Search .................. 348/750, 751, 348/756, 757, 781, 782; 349/5, 8, 9; 353/20, 31, 33, 34, 37; 359/495, 634; H04N 5/74; G02F 1/1335; G03B 21/14

(56) References Cited

U.S. PATENT DOCUMENTS

| 5,534,949 | A | * | 7/1996 | Baron ..................... 348/742 |
| 5,815,221 | A | * | 9/1998 | Kojima et al. .............. 348/751 |
| 5,877,824 | A | * | 3/1999 | Sarayeddine .................. 349/8 |
| 5,883,681 | A | * | 3/1999 | Kono et al. ................. 348/751 |
| 6,113,239 | A | * | 9/2000 | Sampsell et al. ............. 353/31 |
| 6,252,636 | B1 | * | 6/2001 | Bartlett ................... 348/743 |
| 6,364,488 | B1 | * | 4/2002 | Lin ......................... 353/31 |
| 6,384,972 | B1 | * | 5/2002 | Chuang .................... 359/495 |
| 6,402,323 | B1 | * | 6/2002 | Shiue et al. ................ 353/20 |
| 6,454,416 | B2 | * | 9/2002 | Aoto et al. ................. 353/31 |
| 6,549,339 | B2 | * | 4/2003 | Choi et al. ................ 359/634 |
| 6,550,919 | B1 | * | 4/2003 | Heine ....................... 353/31 |
| 2001/0055159 | A1 | * | 12/2001 | Choi et al. ............... 359/634 |
| 2002/0089679 | A1 | * | 7/2002 | Yi et al. ................... 358/1.9 |

* cited by examiner

Primary Examiner—John Miller
Assistant Examiner—Brian Yenke
(74) Attorney, Agent, or Firm—Darby & Darby

(57) ABSTRACT

Disclosed is a color separating/synthesizing apparatus which uses three polarized beam splitters and one dichroic filter, as compared to a conventional system using four polarized beam splitters, thereby achieving a lightness in weight and a reduction in costs while achieving an improvement in performance.

6 Claims, 5 Drawing Sheets

COLOR SEPARATING/SYNTHESIZING APPARATUS

BACKGROUND OF THE INVENTION

1. Field of the Invention

The present invention relates to a projection system, and more particularly to a color separating/synthesizing apparatus which uses three polarized beam splitters and one dichroic filter, as compared to a conventional system using four polarized beam splitters, thereby achieving a lightness in weight and a reduction in costs while achieving an improvement in performance.

2. Description of the Prior Art

In pace with the development of large-scale displays, the development of data projectors, projection TVs, and projection monitors, which use projection techniques, have been accelerated. Recently, research has been made in association with reflective liquid crystal panels including a reflective electrode arranged at each pixel to achieve an improvement of the aspect ratio of the pixel. Also, application of such reflective liquid crystal panels to projection type liquid crystal projectors have been made. Reflective liquid crystal panels can make it possible to realize miniature projectors having a high efficiency because they provide an improved aspect ratio, as compared to conventional transmission type liquid crystal panels.

The above mentioned projection system mainly includes an illumination unit, a color separating/synthesizing unit, and a projection unit. Where such a projection system uses a three-plate type reflective liquid crystal display (LCD), its color separating/synthesizing unit may be the most important element for an improvement in the contrast of the screen.

The color separating/synthesizing unit may include a Color Coner™, a Philips prism, a Color Quad TM, or an X-prism. These configurations for the color separating/synthesizing unit are illustrated in FIGS. 1 to 4, respectively.

Figure 1:
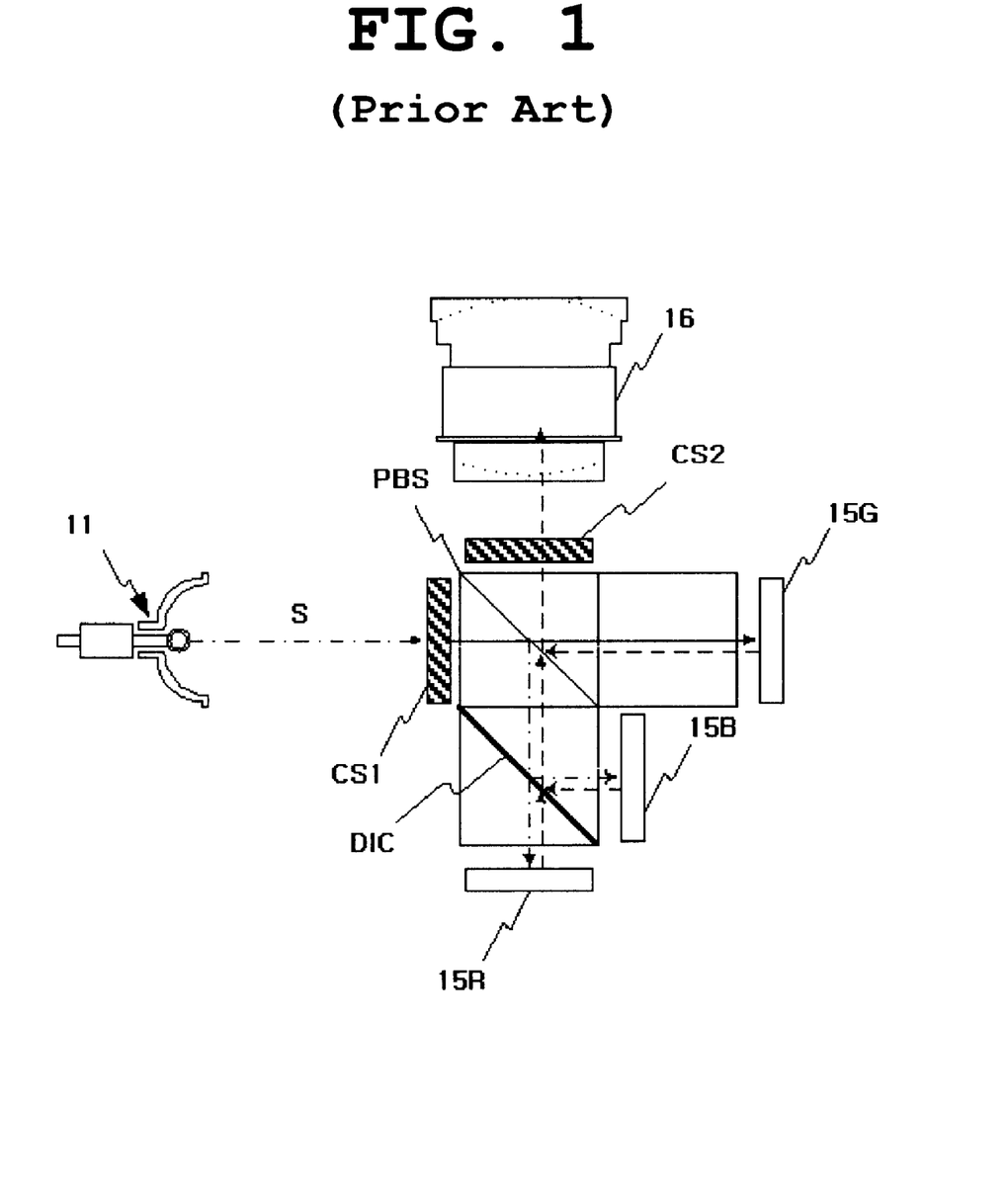
FIG. 1 is a schematic view illustrating a conventional projection system using a Color Coner™ as its color synthesizing/synthesizing unit.

FIG. 1 illustrates a conventional projection system using a Color Coner™ as its color synthesizing/synthesizing unit. Now, the operation of this projection system will be described in conjunction with FIG. 1. Non-polarized white light emitted from a lamp 11 is splitted into P and S waves by a polarization means. The polarized light is then incident to a first color selecting retarder CS1. The first color selecting retarder CS1 serves to polarize G (green)-color light beams into P waves while transmitting S-polarized light beams. A polarized beam splitter, which is denoted by the reference character PBS, is arranged downstream from the first color selecting retarder CS1. The polarized beam splitter PBS allows P-polarized G-color light components of the light incident thereto after being transmitted through the first color selecting polarization plate CS1 to be transmitted therethrough while reflecting the remaining components of the incident light, thereby changing the travel direction of the remaining light components.

A dichroic filter DIC is arranged downstream from the polarized beam splitter PBS to separate B (blue) and R (red)-color components from the light reflected by the polarized beam splitter PBS. The P-polarized G-color light beams transmitted through the polarized beam splitter PBS, and the B and R-color light beams separated by the dichroic filter DIC are projected onto reflective LCDs 15G, 15B, and 15R, respectively, and then reflected by those reflective LCDs 15G, 15B, and 15R while containing images respectively corresponding thereto. Finally, the image-containing R, G, and B-color light beams are incident to a projection unit 16.

Where a Color Coner™ is used as the color separating/synthesizing unit of the projection system, as mentioned above, there may be a reflection difference between the P and S waves due to the performance of the dichroic filter DIC, thereby resulting in a loss of light. Furthermore, a reduction in contrast occurs because one polarized beam splitter PBS and color selecting retarders or retarder stacks CS1 and CS2, as polarization elements, are used.

Figure 2:
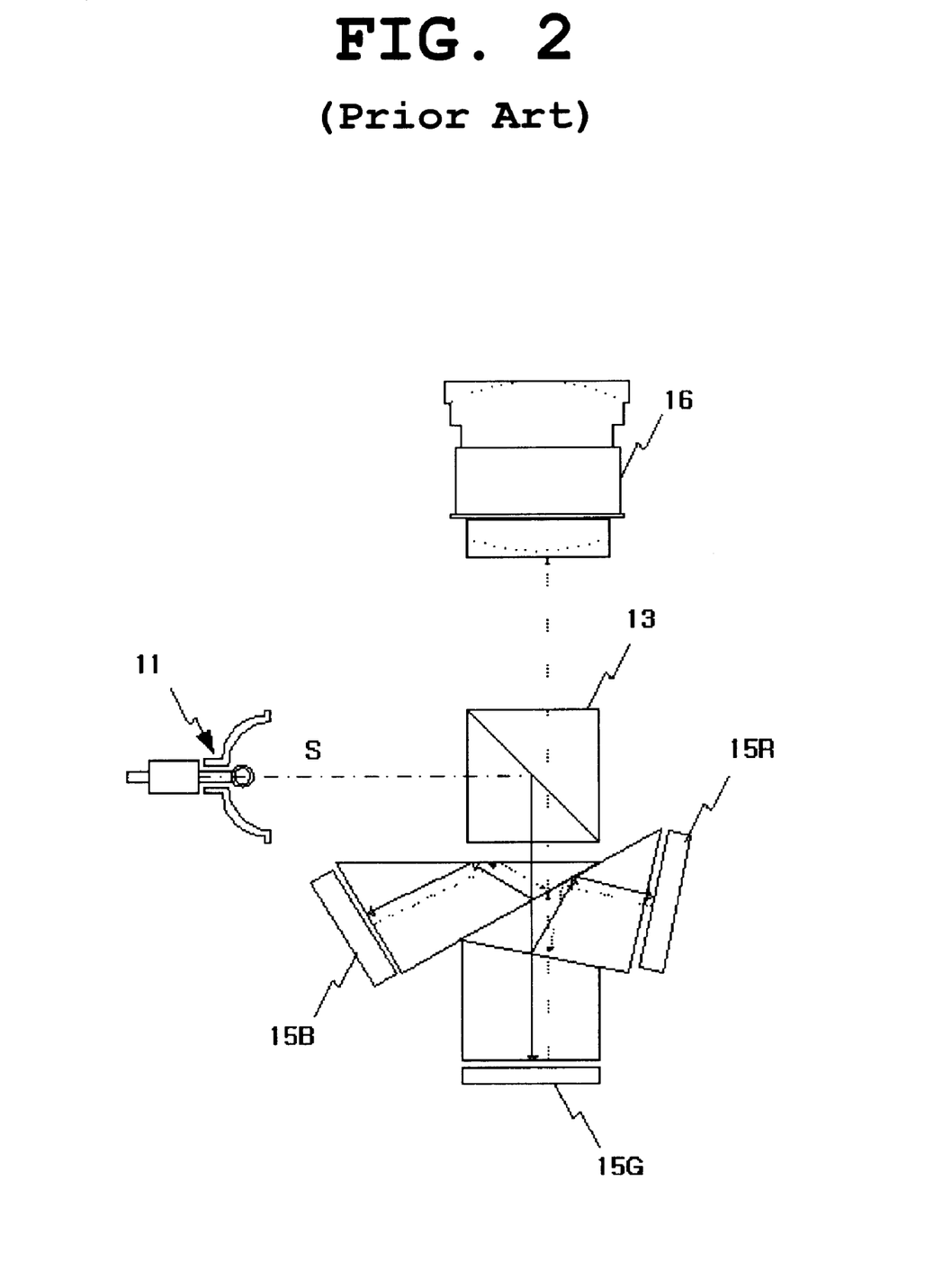
FIG. 2 is a schematic view illustrating a conventional projection system using a Philips prism as its color synthesizing/synthesizing unit.

FIG. 2 briefly illustrates a conventional projection system using a Philips prism as its color synthesizing/synthesizing unit. Now, the operation of this projection system will be described in conjunction with FIG. 2. Non-polarized white light emitted from a lamp 11 is incident to a polarization means (not shown) which, in turn, extracts only S waves from the incident light. The S-polarized light is then reflected by a polarized beam splitter 13, and then sequentially splitted into a plurality of desired color light components such as red, green, and blue-color light components. A prism assembly not denoted by any reference numeral is also provided to allow the three color light components to be incident to three reflective LCDs 15R, 15G, and 15B, respectively.

The prism assembly includes three prisms spaced from one another by a desired angle while providing two color separation surfaces. A dichroic coating is formed on each color separation surface in order to achieve a desired color separation.

Where such a Philips prism is used as the color separating/synthesizing unit of the projection system, each element of the system should have a very sophisticated structure. As a result, there is a difficulty in manufacturing the projection system. This may result in an increase in the manufacturing cost. In similar to the case using the Color Coner™, there may be a reflection difference between the P and S waves at each color separation surface formed with a dichroic coating, thereby resulting in a loss of light. Furthermore, there is a considerable deviation depending on the performance of the dichroic coating. For this reason, it is difficult to apply this system to a projector using an LCD which is a polarization element.

Figure 3:
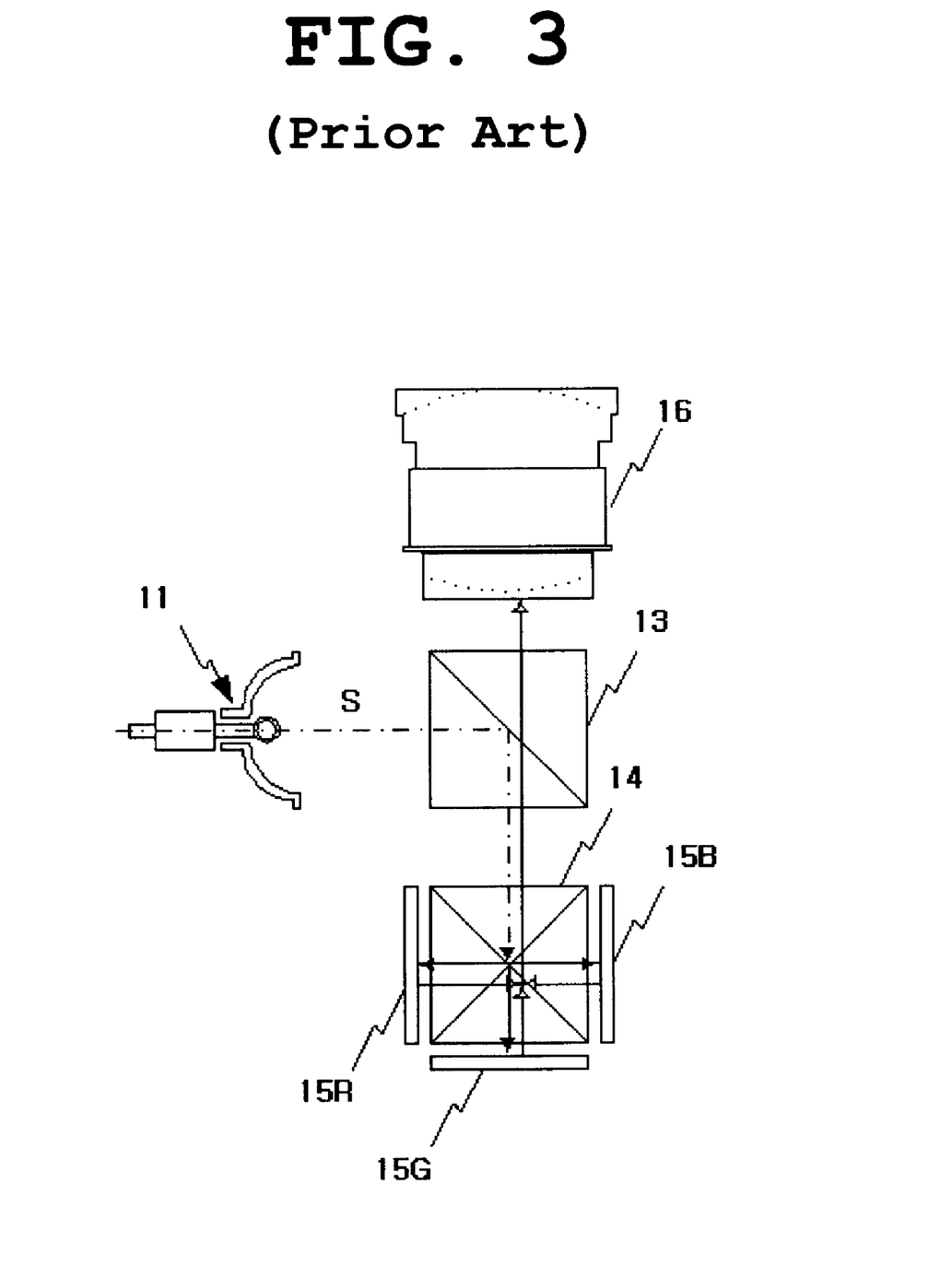
FIG. 3 is a schematic view illustrating a conventional projection system using an X-prism as its color synthesizing/synthesizing unit.

FIG. 3 briefly illustrates a conventional projection system using an X-prism as its color synthesizing/synthesizing unit. Non-polarized white light emitted from a lamp 11 is directed to a polarization means (not shown) which, in turn, extracts polarized S waves from the light, thereby generating polarized illumination light beams. The polarized S waves are then incident to a polarized beam splitter 13. The polarized beam splitter 13 completely reflects the incident polarized S waves in accordance with its characteristics. The reflected light is then directed to an X-prism 14.

The light incident to the X-prism 14 is splitted into R, G, and B-color components which are, in turn, reflected by respective reflective liquid crystal panels 15R, 15G, and 15B. Thereafter, the R, G, and B-color light beams are incident again to the polarized beam splitter 13 along the same optical path.

When a liquid crystal is at its ON state, the light beam modulated into an image by the region of the reflective liquid crystal panel 15R, 15G, or 15B associated with the liquid crystal is emitted in a state in which its polarization direction is rotated by 90°. In other words, an incident S-polarized light beam is converted into a P-polarized light beam while being reflected. As a result, the light beam corresponding to the ON-state region is transmitted through the polarized beam splitter 13, and then projected onto a screen through a projection lens 16, thereby forming an image.

Although the color separating/synthesizing unit having the X-prism configuration illustrated in FIG. 3 is likely to have a simple configuration capable of being advantageous to a miniature, as compared to other configurations as mentioned above, it cannot practically realize a desired performance of projection systems, using known techniques. Practically, desired functions of projection systems are obtained in so far as three polarized beam splitters and three dichroic filters are used, in addition to an X-prism having the configuration shown in FIG. 4.

Figure 4:
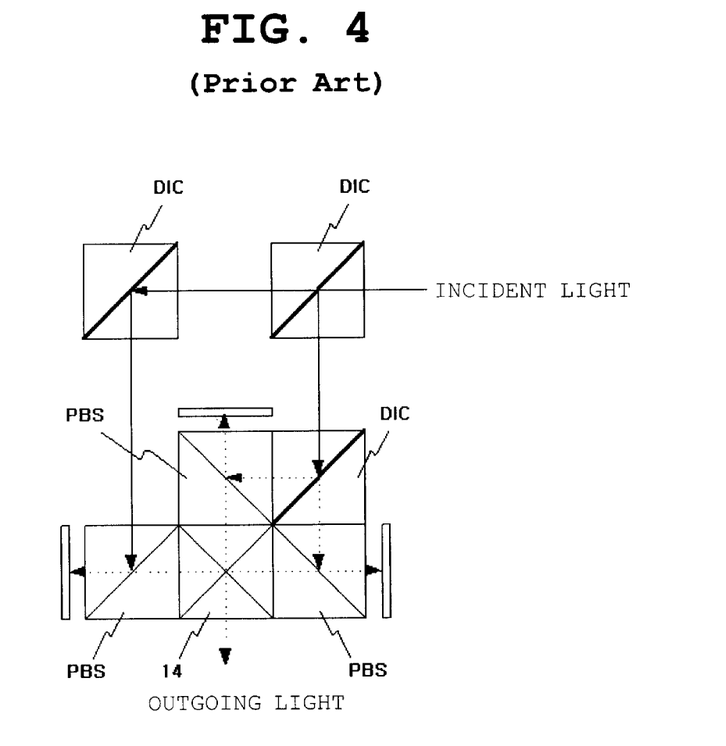
FIG. 4 is a schematic view illustrating the configuration of a practically-applicable X-prism.

Thus, where such an X-prism is used as the color synthesizing/synthesizing unit of the projection system illustrated in FIG. 4, it is necessary to appropriately combine and arrange a plurality of constituting elements, thereby resulting in a complicated structure and an increased volume. As a result, there is a degradation in competitiveness.

Figure 5:
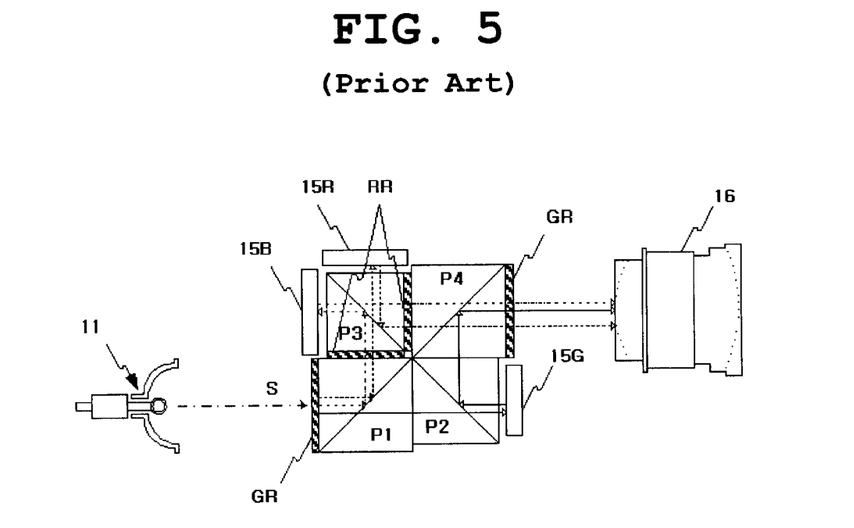
FIG. 5 is a schematic view illustrating a conventional projection system using a Color Quad™ as its color separating/synthesizing unit.

FIG. 5 illustrates a conventional projection system using a Color Quad™ as its color separating/synthesizing unit. Now, the operation of this projection system will be described in conjunction with FIG. 5. Light emitted from a lamp 11 is directed to a polarization means (not shown) which, in turn, extracts polarized S waves from the light. The S-polarized light emerging from the polarization means is then incident to a green-color selecting retarder GR which converts green components of the incident light into P waves. The P-polarized light is then directed to an associated one of four polarized beam splitters included in a Color Quad™, that is, a polarized beam splitter P1.

The color selecting retarder, which is so called a "retarder stack", has characteristics for converting the polarization state of a particular light component selected from R, G, and B light components of incident light in the manufacture of the color selecting retarder. For example, in the case of a red-color selecting retarder, it serves to convert the polarization state of only the R-color component included in an incident light while maintaining the polarization states of the remaining color components.

Accordingly, the polarized beam splitter P1 serves to transmit the green-color component of the incident light therethrough while reflecting the remaining blue and red-color components. Thus, a color separation for the incident light is achieved. The blue and red-color components reflected by the polarized beam splitter P1 are then incident to a red-color selecting retarder RR which, in turn, converts red components of the incident light into P waves. The P-polarized light is then directed to an associated one of the four polarized beam splitters included in the Color Quad™, that is, a polarized beam splitter P2.

Thus, respective R, G, and B-color components of light have different travel paths by virtue of the Color Quad™. In the following description, the four polarized beam splitters included in the Color Quad™ will be simply referred to as "P1", "P2", "P3", and "P4", respectively. First, the travel path of the green-color light component will be described. The green-color light beam emerging from P1 is transmitted again through P2, and then is incident to a reflective LCD denoted by the reference numeral 15G. The green-color light beam incident to the reflective LCD 15G is converted into S waves while being reflected by the reflective LCD 15G in an image-contained state. As a result, the green-color light beam is reflected by P2, and directed to P4. The green-color light beam reaching P4 is also reflected by P4, so that it is directed to a projection unit 16.

In the procedure in which the green-color light beam travels from P4 to the projection unit 16, the green-color light beam is converted into P waves while passing through the green-color selecting retarder GR so as to allow its polarization condition to coincide with those of other color components.

On the other hand, the red-color light beam reflected by P1 is converted into P waves while passing through a red-color selecting retarder RR. Accordingly, the red-color light beam can be transmitted through P3, and then incident to a reflective LCD 15R. The red-color light beam incident to the reflective LCD 15R is converted into S waves while being reflected by the reflective LCD 15R in an image-contained state.

As a result, the red-color light beam is reflected by P3, and then directed to P4. Since the red-color selecting retarder RR is arranged between P3 and P4, the red-color light beam, which is converted into S waves while being reflected by the reflective LCD 15R reaching P4, is converted again into P waves. Accordingly, the red-color light beam is transmitted through P4, and then directed to the projection unit 16.

The blue-color light beam reflected by P1 is reflected by P3 because it has an S-polarized state. This blue-color light beam reflected by P3 is then incident to a reflective LCD 15B. The blue-color light beam incident to the reflective LCD 15B is converted into P waves while being reflected by the reflective LCD 15B in an image-contained state. As a result, the blue-color light beam is transmitted through P3 and P4, irrespective of the color selecting retarders, so that it is directed to the projection unit 16.

Where such a Color Quad™ is used as the color separating/synthesizing unit of the above mentioned projection system, there is a degradation in competitiveness because the Color Quad™ is expensive. Furthermore, the Color Quad™ is relatively heavy, as compared to the Color Coner™. This further degrades the competitiveness of the system.

SUMMARY OF THE INVENTION

Therefore, an object of the invention is to eliminate the above mentioned problems, and to provide a color separating/synthesizing apparatus which uses three polarized beam splitters and one dichroic filter, as compared to conventional systems using four polarized beam splitters, thereby achieving a lightness in weight and a reduction in costs while achieving an improvement in performance.

In accordance with the present invention, this object is accomplished by providing a color synthesizing/synthesizing apparatus comprising: a dichroic filter for allowing a selected one of light components, included in an incident light emitted from a light source, to be transmitted therethrough along a travel path of the incident light while reflecting the remaining light components in a direction perpendicular to the travel path of the incident light; a first synthesizing unit for receiving the light components reflected by the dichroic filter and separating the received light components from each other, the first synthesizing unit also serving to form images respectively corresponding to the separated light components via a first LCD and a second LCD, to synthesize the images, and to allow the synthesized image to be directed in the same direction as the incident light introduced into the dichroic filter; a second synthesizing unit for receiving the light component transmitted through the dichroic filter, forming an image corresponding to the received light component via a third LCD, and reflecting the image in a direction perpendicular to the travel path of the incident light introduced into the dichroic filter; and a third synthesizing unit for synthesizing light beams respectively containing the images formed in the first and second synthesizing units, and allowing the synthesized light to be directed in the same direction as the incident light introduced into the dichroic filter.

The first synthesizing unit may comprise: a first color selecting retarder for allowing the light beams reflected by the dichroic filter to be transmitted therethrough while converting a polarized state of a selected one of the reflected light beams; a polarized beam splitter for reflecting an S-polarized component of the light transmitted through the first color selecting retarder while allowing the remaining component of the transmitted light to be transmitted therethrough; the first LCD for reflecting the S-polarized light reflected by the first polarized beam splitter while forming an image corresponding to the S-polarized light incident thereto and converting the polarized state of the S-polarized light into P waves, the first LCD also serving to allow the reflected P-polarized light to be directed to the first polarized beam splitter; the second LCD for reflecting the P-polarized light transmitted through the first polarized beam splitter while forming an image corresponding to the P-polarized light incident thereto and converting the polarized state of the P-polarized light into S waves, the second LCD also serving to allow the reflected S-polarized light to be directed to the first polarized beam splitter, thereby allowing the S-polarized light to be synthesized, in the first polarized beam splitter, with the P-polarized light directed to the first polarized beam splitter; and a second color selecting retarder for allowing a light, resulting from the synthesis of the S and P-polarized light beams directed to the first polarized beam splitter, to be transmitted therethrough when the light travels in the same direction as the incident light introduced into the dichroic filter, while converting an S-polarized component of the light into P waves.

The second synthesizing unit may comprise: a third color selecting retarder for allowing the light beam transmitted through the dichroic filter to be transmitted therethrough while converting a polarized state of the transmitted light beam; a second polarized beam splitter for allowing the light beam transmitted through the third color selecting retarder to be transmitted therethrough; and a third LCD for reflecting the P-polarized light transmitted through the second polarized beam splitter while forming an image corresponding to the P-polarized light incident thereto and converting the polarized state of the P-polarized light into S waves, the second LCD also serving to allow the reflected S-polarized light to be directed to the second polarized beam splitter so that the light directed to the second polarized beam splitter is reflected by the second polarized beam splitter in a direction perpendicular to the travel direction of the incident light introduced into the dichroic filter.

The third synthesizing unit may comprise a third polarized beam splitter for allowing the light emerging from the first synthesizing unit to be transmitted therethrough while reflecting the light emerging from the second synthesizing unit, thereby allowing all the light beams to be directed in the same direction as the incident light introduced into the dichroic filter.

The dichroic filter may comprise a flat plate type dichroic filter.

The color separating/synthesizing apparatus may further comprise polarized-state coinciding means arranged on a travel path of the light beams emerging from the third polarized beam splitter and adapted to allow the polarized states of the light beams to have the same polarized state.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Now, preferred embodiments of the present invention will be described in conjunction with the annexed drawings.

Figure 6:
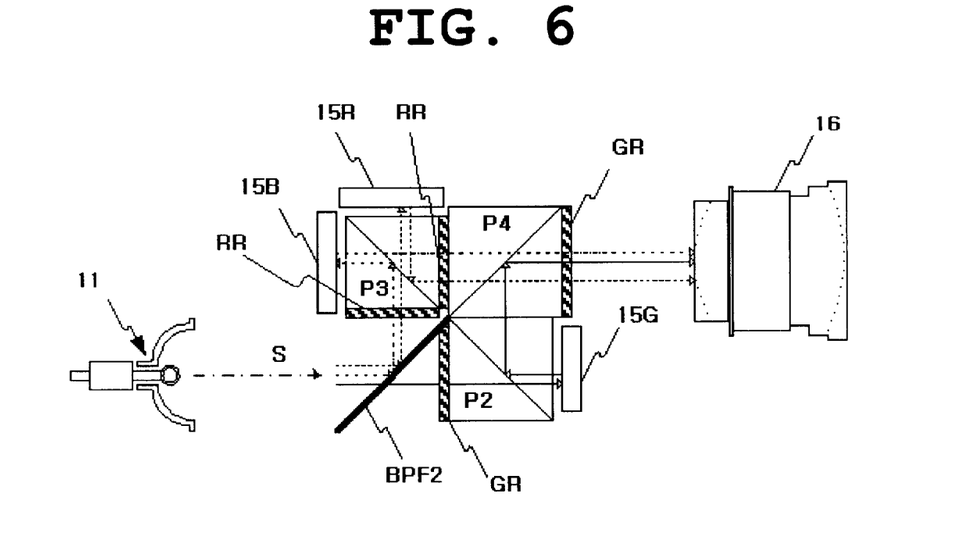
FIG. 6 is a schematic view illustrating a projection system to which a color separating/synthesizing apparatus according to an embodiment of the present invention is applied.

FIG. 6 briefly illustrates a projection system to which a color separating/synthesizing apparatus according to an embodiment of the present invention is applied. The operation of the color separating/synthesizing apparatus will be described with reference to the configuration of FIG. 6.

Light emitted from a lamp 11 is incident to a polarization means (not shown) which, in turn, extracts only P waves from the incident light. The P-polarized light passing through the polarization means is incident to a dichroic filter BPF1 which allows only the green-color component of the incident light to be transmitted therethrough. The green-color light beam emerging from the dichroic filter BPF1 is then directed to an associated one of three polarized beam splitters, that is, a polarized beam splitter P2.

The remaining blue and red-color components of the incident light not allowed to be transmitted through the dichroic filter BPF1 are reflected by the dichroic filter BPF1. Thus, color separation for the incident light is achieved. The blue and red-color components reflected by the dichroic filter BPF1 are then incident to a blue-color selecting retarder BR which, in turn, converts blue components of the incident light into S waves. The S-polarized light beam is then directed to an associated one of the three polarized beam splitters, that is, a polarized beam splitter P3.

Thus, respective R, G, and B-color components of light have different travel paths by virtue of the polarized beam splitters. In the following description, the three polarized beam splitters included in the color synthesizing/synthesizing apparatus will be simply referred to as "P1", "P2", and "P3", respectively. First, the travel path of the green-color light component will be described. The green-color light beam passing through the dichroic filter BPF1 is transmitted again through P2, and then is incident to a reflective LCD denoted by the reference numeral 15G. The green-color light beam incident to the reflective LCD 15G is converted into S waves while being reflected by the reflective LCD 15G in an image-contained state.

As a result, the green-color light beam is reflected by P2, and directed to P4. The green-color light beam reaching P4 is also reflected by P4, so that it is directed to a projection unit 16. In the procedure in which the green-color light beam travels from P4 to the projection unit 16, the green-color light beam is converted into P waves while passing through a green-color selecting retarder GR so as to allow its polarization condition to coincide with those of other color components.

On the other hand, the red-color light beam reflected by the dichroic filter BPF1 is transmitted through P3 because it has a P-polarized state. The red-color light beam emerging from P3 is then incident to a reflective LCD 15R. The red-color light beam incident to the reflective LCD 15R is converted into S waves while being reflected by the reflective LCD 15R in an image-contained state.

As a result, the red-color light beam emerging from the reflective LCD 15R is reflected by P3, and then directed to P4. Since a red-color selecting retarder RR is arranged between P3 and P4, the red-color light beam, which is converted into S waves while being reflected by the reflective LCD 15R reaching P4, is converted again into P waves. Accordingly, the red-color light beam is transmitted through P4, and then directed to the projection unit 16.

The blue-color light beam reflected by the dichroic filter BPF1 has a P-polarized state. This P-polarized blue-color light beam is converted into S waves while passing through a blue-color selecting retarder BR. As a result, the blue-color light beam is allowed to be reflected by P3. This blue-color light beam reflected by P3 is then incident to a reflective LCD 15B. The blue-color light beam incident to the reflective LCD 15B is converted again into P waves while being reflected by the reflective LCD 15B in an image-contained state. As a result, the blue-color light beam is transmitted through P3 and P4, irrespective of the red-color selecting retarder RR, so that it is directed to the projection unit 16.

The dichroic filter BPF1 has a flat plate structure. By virtue of such a structure, the light transmission and reflection portions of the dichroic filter BPF1 define different optical paths depending on the component of light incident thereto, respectively. However, such a problem may be tolerated by virtue of an illumination redundancy generally given.

The dichroic filter serves to keep the polarized state of incident light, as compared to color selecting retarders and polarized beam splitters. By virtue of such characteristics of the dichroic filter, it is possible to obtain an enhanced polarization purity of incident light, as compared to general systems using a Color Quad™. As a result, an improvement in the contrast of the entire projection system can be achieved.

As mentioned above, the dichroic filter BPF1 is configured to transmit only the green-color component of light therethrough.

The above mentioned embodiment of the present invention is associated with the case in which the polarized state of light does not correspond to S waves, but corresponds to P waves. In this case, it is possible to achieve an improvement in characteristics while using a more simple configuration because no or little S waves are mixed with P waves transmitted through the polarized beam splitter, by virtue of the characteristics of the polarized beam splitter.

Figure 7:
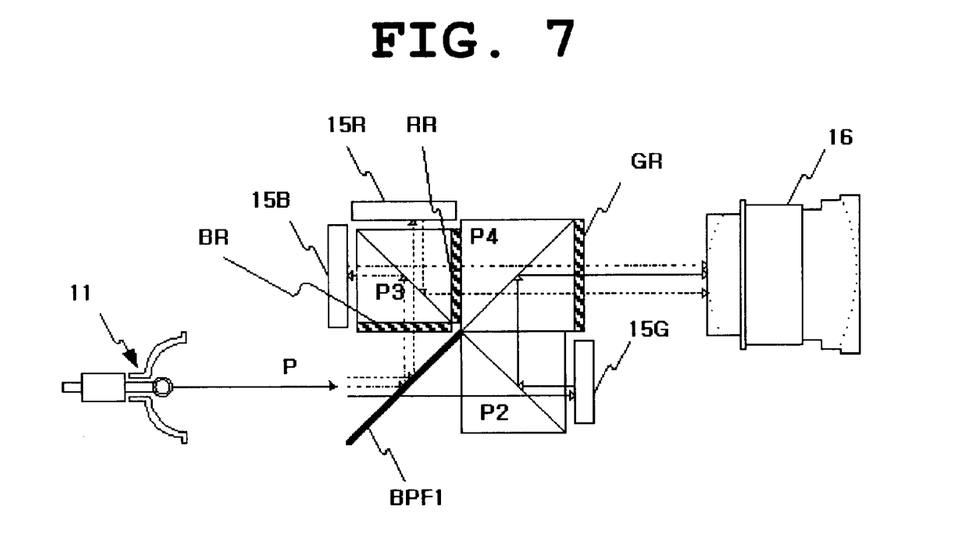
FIG. 7 is a schematic view illustrating a projection system to which a color separating/synthesizing apparatus using S-polarized components of incident light in accordance with another embodiment of the present invention, as compared to the case of FIG. 6, is applied.

Of course, the present invention may be implemented in the case in which S waves are used, in place of P waves, as compared to the case illustrated in FIG. 6. This is illustrated in FIG. 7.

Now, the operation of a color separating/synthesizing apparatus according to another embodiment will be described in conjunction with FIG. 7. Light emitted from a lamp 11 is incident to a polarization means (not shown) which, in turn, extracts only S waves from the incident light. The S-polarized light passing through the polarization means is incident to a dichroic filter BPF2 which allows only the green-color component of the incident light to be transmitted therethrough. The green-color light beam emerging from the dichroic filter BPF2 is then directed to a green-color selecting retarder GR. The green-color light beam is transmitted through the green-color selecting retarder GR while being converted into P waves. The resultant P-polarized light beam is then directed to an associated one of three polarized beam splitters, that is, a polarized beam splitter P2.

The remaining blue and red-color components of the incident light not allowed to be transmitted through the dichroic filter BPF2 are reflected by the dichroic filter BPF1. Thus, color separation for the incident light is achieved. The blue and red-color components reflected by the dichroic filter PF1 are then incident to a red-color selecting retarder RR which, in turn, converts red-color components of the incident light into P waves. The P-polarized light beam is then directed to an associated one of the three polarized beam splitters, that is, a polarized beam splitter P3.

Thus, respective R, G, and B-color components of light have different travel paths by virtue of the polarized beam splitters. In the following description, the three polarized beam splitters included in the color synthesizing/synthesizing apparatus will be simply referred to as "P1", "P2", and "P3", respectively. First, the travel path of the green-color light component will be described. The green-color light beam passing through the dichroic filter BPF2 is transmitted again through P2, and then is incident to a reflective LCD denoted by the reference numeral 15G. The green-color light beam incident to the reflective LCD 15G is converted into S waves while being reflected by the reflective LCD 15G in an image-contained state.

As a result, the green-color light beam is reflected by P2, and directed to P4. The green-color light beam reaching P4 is also reflected by P4, so that it is directed to a projection unit 16. In the procedure in which the green-color light beam travels from P4 to the projection unit 16, the green-color light beam is converted into P waves while passing through a green-color selecting retarder GR so as to allow its polarization condition to coincide with those of other color components.

On the other hand, the red-color light beam reflected by the dichroic filter BPF2 has an S-polarized state. This red-color light beam is converted into P waves while passing through the red-color selecting retarder RR. Accordingly, the red-color light beam is allowed to be transmitted through P3. The red-color light beam emerging from P3 is then incident to a reflective LCD 15R. The red-color light beam incident to the reflective LCD 15R is converted into S waves while being reflected by the reflective LCD 15R in an image-contained state.

As a result, the red-color light beam emerging from the reflective LCD 15R is reflected by P3, and then directed to P4. Since the red-color selecting retarder RR is arranged between P3 and P4, the red-color light beam, which is converted into S waves while being reflected by the reflective LCD 15R reaching P4, is converted again into P waves. Accordingly, the red-color light beam is transmitted through P4, and then directed to the projection unit 16.

The blue-color light beam reflected by the dichroic filter BPF2 is reflected by P3 because it has an S-polarized state. This blue-color light beam is then incident to a reflective LCD 15B. The blue-color light beam incident to the reflective LCD 15B is converted into P waves while being reflected by the reflective LCD 15B in an image-contained state. As a result, the blue-color light beam is transmitted through P3 and P4, irrespective of the red-color selecting retarder RR, so that it is directed to the projection unit 16.

The dichroic filter BPF2 has a flat plate structure. By virtue of such a structure, the light transmission and reflection portions of the dichroic filter BPF1 define different optical paths depending on the component of light incident thereto, respectively. However, such a problem may be tolerated by virtue of an illumination redundancy generally given.

The dichroic filter serves to keep the polarized state of incident light, as compared to color selecting retarders and polarized beam splitters. By virtue of such characteristics of the dichroic filter, it is possible to obtain an enhanced polarization purity of incident light, as compared to general systems using a Color Quad™. As a result, an improvement in the contrast of the entire projection system can be achieved.

As apparent from the above description, in the color synthesizing/synthesizing apparatus according to the present invention, the number of polarized beam splitters and the number of color selecting retarders are reduced by one, respectively, as compared to conventional color synthesizing/synthesizing devices. Accordingly, the color separating/synthesizing apparatus of the present invention secures a competitiveness in terms of price. Also, the color separating/synthesizing apparatus of the present invention has a reduced weight, thereby providing an increased degree of satisfaction to consumers. In accordance with the color separating/synthesizing apparatus of the present invention, an enhanced polarization purity of light incident to each LCD is obtained, as compared to the general Color Quad™, thereby achieving an improvement in the contrast of the system.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

For example, although polarized beam splitters are used to select a particular polarized state of light emitted from a light source in accordance with the present invention, polarization plates may be used in place of the polarized beam splitters. In this case, the same effect is obtained.

What is claimed is:

1. A color synthesizing/synthesizing apparatus comprising:
   a dichroic filter for allowing a selected one of light components, included in an incident light emitted from a light source, to be transmitted therethrough along a travel path of the incident light while reflecting the remaining light components in a direction perpendicular to the travel path of the incident light;
   a first synthesizing unit for receiving the light components reflected by the dichroic filter and separating the received light components from each other, the first synthesizing unit also serving to form images respectively corresponding to the separated light components via a first LCD and a second LCD, to synthesize the images, and to allow the synthesized image to be directed in the same direction as the incident light introduced into the dichroic filter;
   a second synthesizing unit for receiving the light component transmitted through the dichroic filter, forming an image corresponding to the received light component via a third LCD, and reflecting the image in a direction perpendicular to the travel path of the incident light introduced into the dichroic filter; and
   a third synthesizing unit for synthesizing light beams respectively containing the images formed in the first and second synthesizing units, and allowing the synthesized light to be directed in the same direction as the incident light introduced into the dichroic filter.

2. The color synthesizing/synthesizing apparatus according to claim 1, wherein the first synthesizing unit comprises:
   a first color selecting retarder for allowing the light beams reflected by the dichroic filter to be transmitted therethrough while converting a polarized state of a selected one of the reflected light beams;
   a polarized beam splitter for reflecting an S-polarized component of the light transmitted through the first color selecting retarder while allowing the remaining component of the transmitted light to be transmitted therethrough;
   the first LCD for reflecting the S-polarized light reflected by the first polarized beam splitter while forming an image corresponding to the S-polarized light incident thereto and converting the polarized state of the S-polarized light into P waves, the first LCD also serving to allow the reflected P-polarized light to be directed to the first polarized beam splitter;
   the second LCD for reflecting the P-polarized light transmitted through the first polarized beam splitter while forming an image corresponding to the P-polarized light incident thereto and converting the polarized state of the P-polarized light into S waves, the second LCD also serving to allow the reflected S-polarized light to be directed to the first polarized beam splitter, thereby allowing the S-polarized light to be synthesized, in the first polarized beam splitter, with the P-polarized light directed to the first polarized beam splitter; and
   a second color selecting retarder for allowing a light, resulting from the synthesis of the S and P-polarized light beams directed to the first polarized beam splitter, to be transmitted therethrough when the light travels in the same direction as the incident light introduced into the dichroic filter, while converting an S-polarized component of the light into P waves.

3. The color separating/synthesizing apparatus according to claim 1, wherein the second synthesizing unit comprises:
   a third color selecting retarder for allowing the light beam transmitted through the dichroic filter to be transmitted therethrough while converting a polarized state of the transmitted light beam;
   a second polarized beam splitter for allowing the light beam transmitted through the third color selecting retarder to be transmitted therethrough; and
   a third LCD for reflecting the P-polarized light transmitted through the second polarized beam splitter while forming an image corresponding to the P-polarized light incident thereto and converting the polarized state of the P-polarized light into S waves, the second LCD also serving to allow the reflected S-polarized light to be directed to the second polarized beam splitter so that the light directed to the second polarized beam splitter is reflected by the second polarized beam splitter in a direction perpendicular to the travel direction of the incident light introduced into the dichroic filter.

4. The color separating/synthesizing apparatus according to claim 1, wherein the third synthesizing unit comprises a third polarized beam splitter for allowing the light emerging from the first synthesizing unit to be transmitted therethrough while reflecting the light emerging from the second synthesizing unit, thereby allowing all the light beams to be directed in the same direction as the incident light introduced into the dichroic filter.

5. The color separating/synthesizing apparatus according to claim 1, wherein the dichroic filter comprises a flat plate type dichroic filter.

6. The color separating/synthesizing apparatus according to claim 4, further comprising:

polarized-state coinciding means arranged on a travel path of the light beams emerging from the third polarized beam splitter and adapted to allow the polarized states of the light beams to have the same polarized state.

* * * * *

UNITED STATES PATENT AND TRADEMARK OFFICE
CERTIFICATE OF CORRECTION

PATENT NO. : 6,678,015 B2  
DATED : January 13, 2004  
INVENTOR(S) : Jong S. Yi et al.

It is certified that error appears in the above-identified patent and that said Letters Patent is hereby corrected as shown below:

<u>Title page,</u>  
Item [75], Inventors, delete "Koan Young Oh, Yong-Shi (KR)" and substitute  
-- Koan Young Oh, Yongin-shi (KR) --.

Signed and Sealed this

Fourth Day of May, 2004

JON W. DUDAS  
*Acting Director of the United States Patent and Trademark Office*